Patented July 23, 1946

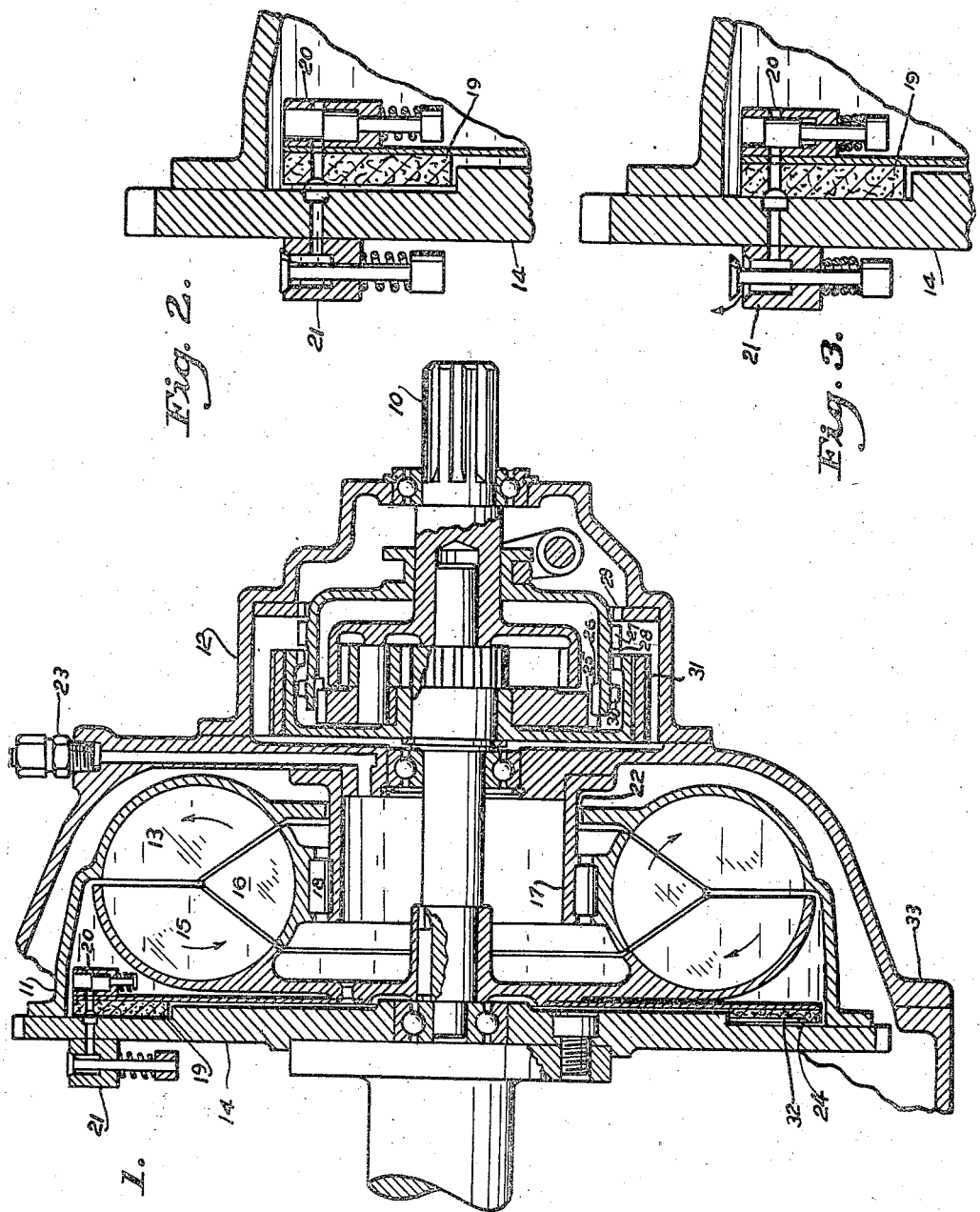

2,404,657

UNITED STATES PATENT OFFICE 2,404,657

TRANSMISSION

Albert O. Roberts and John J. Wharam, Dearborn, Mich., assignors to Ford Motor Company, Dearborn, Mich., a corporation of Delaware Application January 26, 1945, Serial No. 574,652

5 Claims. (Cl. 192—3.2)

This invention relates to a hydraulic transmission device and, more particularly, to a hydraulic unit of the torque converter type.

The chief disadvantage of the hydraulic torque converter is that the efficiency of the converter drops radically after having attained a maximum efficiency of about 85%. Comparing a hydraulic torque converter efficiency with that of the hydraulic coupling, it has been found that the efficiency curve of the coupling is a straight line, gradual rise and attains a maximum efficiency of about 98% which is extremely desirable; but the coupling is deficient in that the rise is very slow and maximum efficiency is obtained only at maximum speed at which time the torque is almost zero. However, the efficiency of the torque converter suddenly rises, obtaining a peak efficiency in a very short time, but since the efficiency never rises to more than about 85%, it is, therefore, apparent from the economical aspect that the hydraulic torque converter, as such, would not be feasible or capable of competing with other types of transmissions, especially in the automotive field.

It is known that the hydraulic coupling and torque converter differ primarily in that the converter contains an additional set of blades from which the reaction from the impeller is impressed on the runner. Therefore, the loss of efficiency of the converter may be attributed to the reaction blade in that greater frictional and vortical losses occur. The material difference between the torque converter of the above type and of the hydraulic coupling lies in the fact that the speed differential between runner and impeller of a converter is greater than that of the coupling under steady running condition.

In the case of each unit, of course, the torque is greatest when the driven runner is stationary; the torque drops to zero as the impeller and runner closely approach the same speed. However, the efficiency of torque transmission by the converter, being much greater at the lower speed than that of the coupling, is greatly desired for transmissions, especially for automobiles. In fact, whereas, a converter obtains an efficiency of about 85%, when the speed ratio of the impeller to the runner is about 5 to 2, the coupling efficiency is only about 40%.

The transmission of torque from the impeller to the runner and the efficiency thereof, has only superficially been explained above, but is completely discussed in "Torque Converters" by C. F. Heldt.

Therefore, an object of this invention is to obtain a simplified transmission having a hydraulic torque converter for high efficiency at low speeds, and a direct drive at high speeds.

Another object of this invention is to provide means by which the frictional and vortical losses may be reduced between the runner, impeller, and reaction rotor.

Another object of this invention is to provide means by which the hydraulic unit may be replaced by direct drive at any point on an efficiency curve, or at any given speed of the runner.

Another object of this invention is to provide automatic means to frictionally engage a clutch so as to change transmission from a hydraulic drive to a direct drive unit.

With these and other objects in view, the invention is expressely described in the specification, claimed in the claims and illustrated in the accompanying drawing, in which:

Figure 1 is a cross sectional view of a hydraulic transmission embodying the present invention.

Figure 2 is an enlarged view of the activating means for engaging the clutch under static pressure.

Figure 3 illustrates the activating means and clutch in the engaged position.

Referring to Figure 1, the transmission 10 is an integral unit providing a torque converter 11 and gearbox 12. The hydraulic torque converter is composed of the impeller 13 which is secured to the flywheel 14, runner or driven member 15 and reaction rotor or stator 16. Reaction rotor 16 is mounted on the hub 17, which comprises part of the housing, fixedly secured to the motor or to the frame member of the vehicle. The reaction rotor 16 is mounted on an overrunning clutch 18, so that it may provide the stationary reaction member to impress the torque from the impeller 13 on to the driven member 16; hence, the reaction rotor will lock when forced counter to the rotation of the impeller, but will follow the impeller when the torque becomes negligible.

Friction clutch 19 is secured to the runner 15 and engages the flywheel 14. The engagement of the clutch is brought about by the valves 20 and 21. Valves 20 and 21 are illustrated as spring-loaded valves counter-acting centrifugal force at lower speeds; however, valves of other designs and actuated by different means can also be used. The number of valves required will, of course, depend on the size of the unit; the prerequisite being, of course, the quick and even unloading of the fluid between the flywheel and the clutch.

The operation of valves 20 and 21 is clearly shown in Figures 2 and 3. Figure 2, of the valve 20, is open, allowing a flow of fluid between flywheel and clutching surface, and valve 21 is closed, thereby maintaining a static state. In Figure 3, valve 20 is closed, preventing flow of fluid, and valve 21 is opened, bleeding the cushioning fluid from between the flywheel and clutching surface. The operation of these valves is simultaneous and the fluid is ejected into the housing 11. The passage through the flywheel connecting the two valves is of smaller diameter than the passage through the clutch, so that, should valve 21 open prematurely, due to excessive acceleration, the draining through the valves will not be great enough to destroy the efficiency of the unit.

One embodiment of the invention is carried out as follows:

The fluid at rest in the unit settles into the enclosure formed by the impeller, and the excess fluid overflows at 22 into the housing 33, which acts as a reservoir. Upon starting, the fluid within the impeller enclosure unit is distributed in the torque converter, which includes the spaces between the runner 15 and the clutch plate 19 and flywheel 14. The fluid in the housing is pumped to a reservoir (not shown) using the flywheel as a pump or some other pumping means. The fluid flows from the reservoir into the torque converter through the feed line 23, thereby maintaining the unit completely filled to the overflow level 22 at all times while operating.

The fluid is forced into movement in various directions as the speed of the impeller rises. There is, of course, the vortical movement within the space defined by the runner, impeller, and reaction rotor. Another movement is the flow of fluid to the outer periphery of the cavity formed by the impeller-flywheel unit and the runner. The force of this fluid is employed to actuate the clutch 18.

As the speed of the runner-clutch unit rises, the spring-loaded valves 20 and 21 are actuated (at a predetermined speed) so that the static conditions (vide Figure 2) become unbalanced (vide Figure 3) thereby engaging the clutch and locking the torque converter into direct drive. The unbalancing of the static condition is accomplished automatically by the centrifugal force on the valves, so that the cushioning fluid is bled from between the flywheel and clutch plate. This allows force exerted by revolving fluid to be applied to the clutch plate.

The bleeding of the fluid is accomplished through the annular groove 24 and the several connecting radial grooves 32 after the opening of valve 21, allowing the bleeding; and the closing of valve 20, preventing further flow of fluid between clutch plate and flywheel. Radial grooves 32 extend only to the annular groove 24, thereby quickly and efficiently bleeding all of the fluid from between the clutch disc and flywheel. The uninterrupted face of the clutch plate seals the remaining fluid within the unit. The force engaging the clutch will exist until the rotational speed drops, so that the spring-loading of the valves overcomes the centrifugal action, thereby allowing fluid to again flow between clutch and flywheel so that the forces are again static.

Thus, in a torque converter of about 4" radius, we have found that at about 2500 R. P. M. a median pressure of about 44 lbs. per square inch is exerted on the clutch plate, which provides a smooth clutching action. By spring-loading the valves to operate at 2500 R. P. M., providing a forward speed of about 40 to 45 miles per hour, we are able to obtain a maximum efficiency of torque transmission of the lower speeds, and are able to disengage the torque converter and simultaneously lock the transmission to direct drive. In this manner, the full advantage of the torque converter is obtained prior to its declining efficiency, and the transmission is converted to direct drive at which speeds direct drive may be used to greatest advantage. However, the valves may be set to operate at any speed thought to be desired or wanted.

Moreover, the speed differential of the flywheel and runner are closely approaching each other and the locking-out of the converter in such manner does not produce a shock that is appreciably noticed. The locking-out also eliminates the torque impressed on the reaction rotor so that the overriding clutch disengages and rotates in the same direction as the impeller-runner unit, thereby eliminating any power losses through friction by turbulence of the fluid.

The power is transmitted from the hydraulic unit to the gearbox 12 which may provide, by various gearing combinations, further reduction or acceleration of power. Gearbox 12, as shown here, however, merely provides, by means of planetary gearing, a forward, a reverse, a neutral, and a positive lock of the rear wheels as an additional parking brake. The transmission, as shown in Figure 1, is in neutral position. To obtain forward motion, gears 25 and 26, and 27 and 28 are engaged. Reverse is obtained by engaging gears 25 and 26, and 27 and 29. The positive lock is obtained by engaging gears 28 and 30, and 27 and 29. No further explanation is necessary, since the gearing is of the conventional planetary type, and is, therefore, well-known and self-explanatory.

Gear 28 is provided with a braking surface and a brake band 31 bears thereon. Brake band 31 is actuated by the braking system of the vehicle, thereby simultaneously stopping the motion of the gears with the vehicle, thus allowing a reduction of momentum of the hydraulic unit and planetary gearing. The brake may be used to facilitate shifting of gears by overcoming any movement of the gears due to residual drag of the converter.

Some changes may be made in the arrangement, construction, and combination of the various parts of the improved construction without departing from the spirit of the invention, and it is the intention to cover by the claims, such claims as may reasonably be included within the scope thereof.

We claim as our invention:

1. In a variable speed transmission of hydraulic torque converter type, having an impeller, a runner and a reaction rotor, said impeller forming an integral unit with a flywheel, said runner having attached thereto a solid but flexible disc clutch element, said clutch element actuated by hydraulic pressure created by centrifugal force produced by the rotating of the fluid between runner and impeller, means attached to said flywheel and clutch element to cause the clutch element to be subjected to a static force and to a dynamic force, said dynamic force engaging said clutch element and flywheel.

2. In a variable speed transmission device of the hydraulic converter type, having an impeller, a runner and a reaction rotor, said runner having a solid disc clutch element fixedly but flexibly secured thereto, said impeller secured to a flywheel forming a housing about the said runner and clutch element and said reaction rotor, said clutch element and flywheel having attached thereto co-operating valves, said valves operating simultaneously at a predetermined speed causing the static condition of the fluid to be unbalanced to exert a force upon said clutch element, thereby engaging said clutch element and flywheel and said valves at a speed below said predetermined speed, simultaneously operating to again cause the fluid forces to become static, thereby disengaging said clutch element from said flywheel.

3. A variable speed transmission of claim 2 in which the valves are activated by centrifugal force, but are spring-loaded to counteract centrifugal force below a predetermined rotational speed.

4. A variable speed transmission of claim 2 in which the valves are activated by centrifugal force on a given weight, said weight having means counteracting said centrifugal force below a predetermined rotational speed.

5. In a variable speed transmission device of the hydraulic converter type, having a housing, a runner, an impeller and a reaction rotor, said runner having a solid disc clutch element fixedly but flexibly secured thereto, said impeller secured to a flywheel and thereby forming a housing enclosing said runner and clutch element and said reaction rotor, said clutch element and flywheel having attached thereto co-operating valves, said valves operating at a predetermined speed, ejecting the fluid between clutch element and flywheel into the housing, pumping means to pump said fluid into a reservoir from which said fluid flows into said transmission, ejecting of said fluid from between said clutch element and flywheel, unbalancing the forces within said transmission, thereby engaging said clutch element with said flywheel.

ALBERT O. ROBERTS.
J. J. WHARAM.